United States Patent
Fitzgerald

(10) Patent No.: US 6,455,146 B1
(45) Date of Patent: Sep. 24, 2002

(54) EXPANSIBLE SYNTHETIC RESIN BAFFLE WITH MAGNETIC ATTACHMENT

(75) Inventor: Gerald E. Fitzgerald, Clinton Township, MI (US)

(73) Assignee: Sika Corporation, Madison Heights, MI (US)

( * ) Notice: Subject to any disclaimer, the term of this patent is extended or adjusted under 35 U.S.C. 154(b) by 0 days.

(21) Appl. No.: 09/703,216

(22) Filed: Oct. 31, 2000

(51) Int. Cl.[7] .............................. B32B 9/00; B32B 3/00; B29C 65/00
(52) U.S. Cl. .................... 428/318.4; 428/137; 428/158; 428/167; 428/172; 428/174; 428/192; 428/212; 428/901; 428/913; 264/41; 264/45.1; 156/83
(58) Field of Search .......................... 428/72, 137, 138, 428/158, 167, 172, 318.4, 900, 913, 174, 192, 212, 68; 296/33; 264/45.4, 176.1, 319, 45.3, 45.9, 46.4, 41, 45.1, 46.7; 181/264, 269; 156/78, 83, 244.11, 244.25; 52/393, 716.5

(56) References Cited

U.S. PATENT DOCUMENTS

| | | | |
|---|---|---|---|
| 3,117,902 A | * | 1/1964 | Holzheimer ................ 428/167 |
| 3,862,880 A | | 1/1975 | Feldman |
| 4,152,476 A | | 5/1979 | Stillman |
| 4,661,053 A | | 4/1987 | Yokota et al. |
| 4,709,781 A | | 12/1987 | Scherzer |
| 4,724,243 A | | 2/1988 | Harrison |
| 4,749,434 A | | 6/1988 | Harrison |
| 4,769,166 A | | 9/1988 | Harrison |
| 4,876,140 A | | 10/1989 | Quackenbush |
| 4,908,164 A | | 3/1990 | Brussino |
| 4,926,963 A | | 5/1990 | Snyder |
| 5,093,394 A | | 3/1992 | Rees et al. |
| 5,094,318 A | | 3/1992 | Maeda et al. |
| 5,153,388 A | | 10/1992 | Wittenmayer et al. |
| 5,189,271 A | * | 2/1993 | Derbyshire ............... 219/10.53 |
| 5,266,133 A | | 11/1993 | Hanley et al. |
| 5,373,027 A | | 12/1994 | Hanley et al. |
| 5,452,508 A | | 9/1995 | Wu |
| 5,453,224 A | | 9/1995 | Kuroda |

(List continued on next page.)

FOREIGN PATENT DOCUMENTS

WO          WO9733686          9/1997

OTHER PUBLICATIONS

Patent Abstract; JP07232664; Method for Cutting of Hollow Part of Hollow Structure by Foam and Foam Forming Member; Published Sep. 5, 1995.
Patent Abstract; JP09085767; Expandable Base Material for Interception of Hollow Chamber of Hollow Structure; Published Mar. 31, 1997.
The Arnold Engineering Company Webpage re: Plastiform 1033 Magnet Material brochure pp. 7.14 through 7.17; Published 11, 1998.

*Primary Examiner*—Donald J. Loney
(74) *Attorney, Agent, or Firm*—Hovey Williams LLP

(57) ABSTRACT

A baffle may conform to and be magnetically coupled to a body having a ferromagnetic component in proximity to the baffle. The baffle includes a first layer of a flexible thermally expansible baffle material which expands when subjected to an elevated temperature, and a second layer of a flexible magnetic material. The baffle may thereby be flexed to conform to an irregular or curved surface. In addition, the baffle may be preformed to provide an irregular or arcuate portion to conform to the body on which it is placed. The magnetic attachment facilitates attachment and removal without the need to provide holes in the body, and upon heating and expansion of the baffle, the baffle material expands to fill cavities and adhere to the inside wall surface of the body on which it is received.

26 Claims, 2 Drawing Sheets

U.S. PATENT DOCUMENTS

| | | |
|---|---|---|
| 5,456,513 A | 10/1995 | Schmidt |
| 5,466,535 A * | 11/1995 | Higgins et al. .............. 428/483 |
| 5,484,970 A | 1/1996 | Suzuki et al. |
| 5,531,914 A | 7/1996 | Mallon et al. |
| 5,567,922 A | 10/1996 | Schmuck et al. |
| 5,631,027 A | 5/1997 | Takabatake |
| 5,642,914 A | 7/1997 | Takabatake |
| 5,649,400 A | 7/1997 | Miwa |
| 5,800,896 A | 9/1998 | Kobayashi |
| 5,806,915 A | 9/1998 | Takabatake |
| 5,829,482 A | 11/1998 | Takabatake |
| 5,904,024 A | 5/1999 | Miwa |
| 5,985,435 A | 11/1999 | Czaplicki et al. |
| 5,989,691 A * | 11/1999 | Furukawa et al. .......... 428/213 |

\* cited by examiner

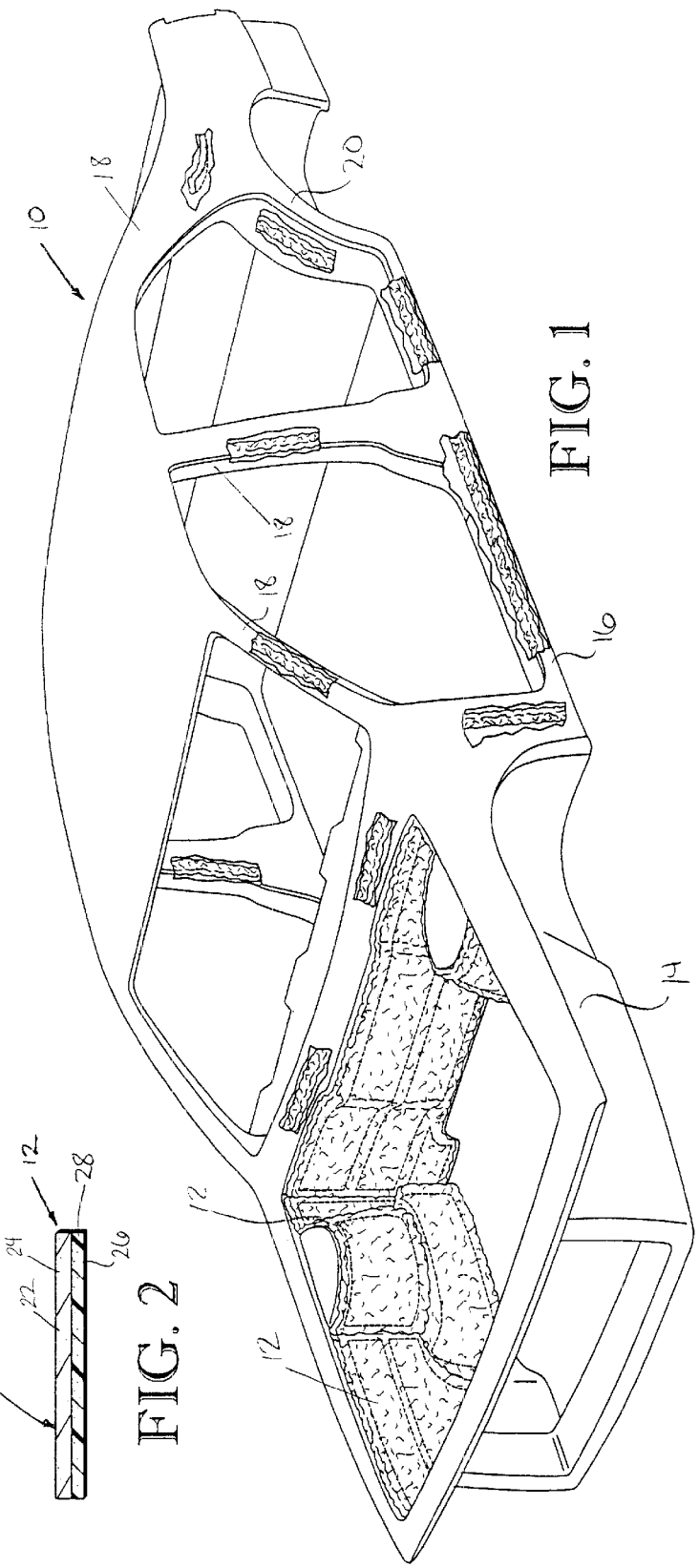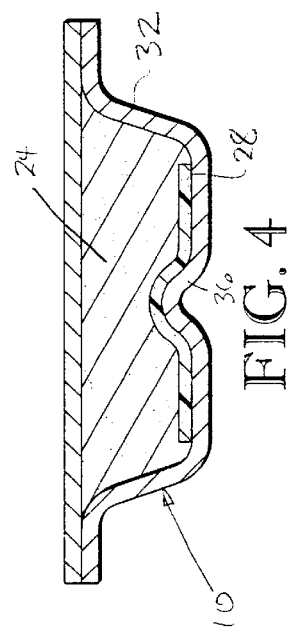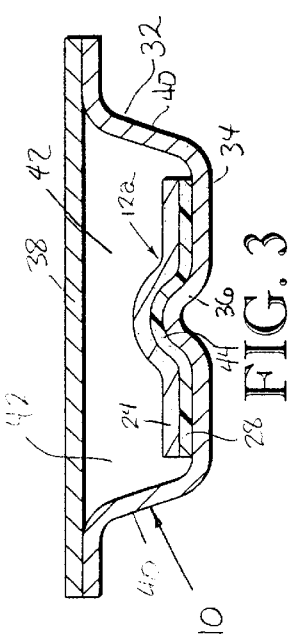

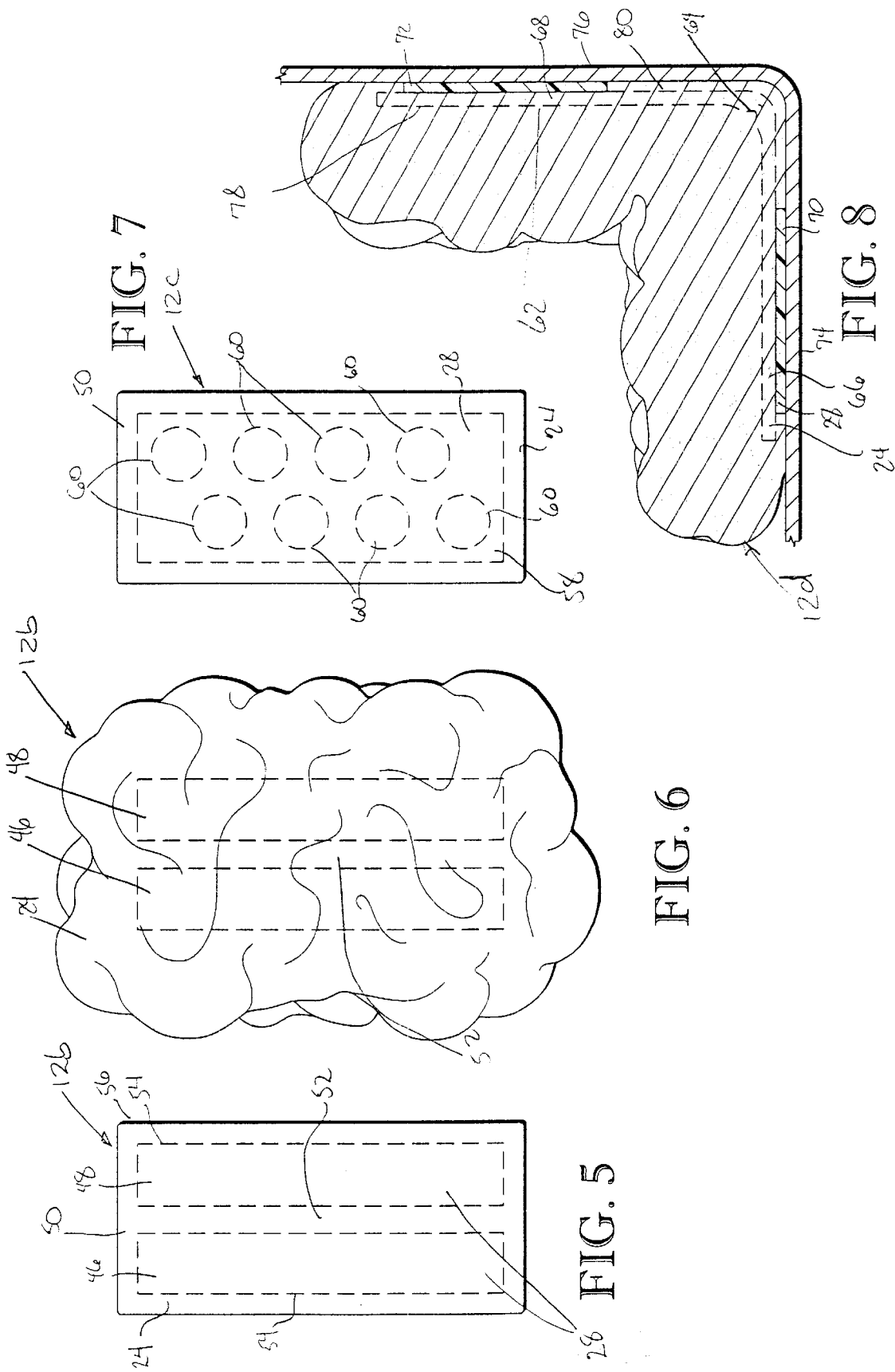

EXPANSIBLE SYNTHETIC RESIN BAFFLE WITH MAGNETIC ATTACHMENT

BACKGROUND OF THE INVENTION

1. Field of the Invention

This invention concerns baffle assemblies useful inside cavities or other open areas of metal structures wherein the baffle assembly may be readily temporarily held in place by magnetic attachment. More particularly, the present invention concerns a baffle assembly having a layer of flexible thermally expandible material and an adjacent layer of flexible magnetic material which permits the baffle to be made into a desired shape and temporarily held against a ferromagnetic metal prior to expansion.

2. Description of the Prior Art

The use of baffle assemblies in automobiles is well known to inhibit sound transmission through panels, pillars, rails and the like of a chassis or unibody structure. While rigid foam materials were initially employed in the cavities, it is now known to use thermally expansible baffle compositions which undergo heat induced expansion to expand in the cavity. Such heat activation may occur when the automobile is passed through a paint baking oven forming a part of the primer or paint curing step of the automobile manufacturing process. Various types of materials have been used, including the dry expansible sealant and baffle composition and product disclosed in U.S. Pat. Nos. 5,266,133 and 5,373,027.

However, the thermally expansible baffle composition must typically be placed in a particular location within the cavity of the vehicle to be effective. After activation and expansion of the baffle composition, it readily conforms to the surrounding panels and adheres thereto, but prior to activation the composition must be at least temporarily held in place. This has required the use of a separate carrier or component on which the thermally expansible baffle composition is mounted, and which in turn is mounted on the vehicle. Examples disclosing various types of parts and components for retaining a baffle composition in place include those shown in U.S. Pat. Nos. 5,506,025 and 5,806,915. These carriers attach to the expansible baffle composition, but require a hole in the surrounding structure for mounting. Such holes may therefore permit the intrusion of corrosion forming agents therethrough. In addition, primer and other coatings applied to the metal inhibit adhesive attachment.

There have also been developed mounts for insertion into a hollow space of a hollow structure such as a vehicle pillar, which mounts include an expandable foam substrate and at least one support panel secured to the substrate using a tack as shown in U.S. Pat. No. 5,904,024. The mount is then secured to the interior wall of the hollow space through either a clip, a magnet, or a suction disc. However, this construction uses a magnet to hold the support panel to the interior wall and not the expansible material itself. There have also been developed magnetized hot melt adhesive articles such as shown in U.S. Pat. Nos. 5,985,435, 4,427,481, 4,724,243 and 4,749,434 which are used to seal a gap or opening in an automobile part, which include thermoplastic resins, tackifiers and the like with magnetized particles to form an extruded mixture. However, these adhesive articles do not satisfy the needs hereof for an initially non-tacky expansible baffle composition.

Thus, there has developed a real need for a baffle composition which may be temporarily secured in place prior to activation, may conform to the surrounding structure prior to activation, is inexpensive to produce, and does not require holes through the structure.

SUMMARY OF THE INVENTION

These needs have largely been met by the expansible synthetic resin baffle with magnetic attachment of the present composition. That is to say, the baffle hereof is simple, inexpensive to manufacture, convenient to install, requires no additional mounting structure or holes in the wall of the structure forming the cavity, and may be cut or formed to a desired shape.

Broadly speaking, the baffle of the present invention is provided as adjacent layers of magnetic material and expansible baffle material. The layers may be co-extruded to form the baffle, or molded into layers. The expansible baffle material is preferably an initially non-tacky thermally expansible material which activates at a temperature preferably within the range of about 100° C. to about 200° C., and which is resilient and flexible prior to expansion. Such a baffle material is disclosed in U.S. Pat. Nos. 5,266,133 and 5,373,027, the disclosure of which is incorporated herein by reference. The expansible material preferably expands to at least 300% and preferably 400% or more of its initial volume during baking. The baffle material may be provided as a relatively thin layer which may be conformed to irregular surfaces, or formed into a three dimensional part of a greater thickness which is pre-conformed to an irregular shape.

The magnetic material is in laminated relationship to the baffle material, whereby the baffle material and magnetic material is side-by-side. The magnetic material may be provided as strips which may cover all or only a portion of the baffle material. Further, the magnetic material is preferably flexible to conform to irregular shapes. The magnetic material may also be perforated to permit enhanced bonding between the baffle material and the wall of the structure after activation and cooling, thereby providing an enhanced bonding between the expanding baffle material and the structure. Advantageously, the magnetic material retains its position in proximity to the wall of the structure throughout the expansion period, and thus the magnetic attachment of the magnetic layer is unaffected by the expansion.

The baffle of the present invention is simple to install, and involves merely placement in a desired position and permitting the magnetic material to attach to the wall of the structure. The structure needs only some ferromagnetic material in sufficient proximity to the baffle to permit magnetic attraction, and thus its use includes not only application to steel and other ferromagnetic metals, but also to compositions with a ferromagnetic metal backing or core. Because no adhesive or holes are required, there is no problem with reapplying or repositioning the baffle. The baffle's application is not limited to automotive uses, but may include placement in marine environments as well as in appliances or the like where sound deadening is desired. These and other advantages will be readily appreciated by those skilled in the art with reference to the drawings and description which follow.

BRIEF DESCRIPTION OF THE DRAWINGS

FIG. 1 is a perspective view of an automobile chassis showing some possible placements for the baffle hereof;

FIG. 2 is a vertical cross sectional view of one embodiment of the baffle hereof prior to placement in a cavity showing both the layer of baffle material and the layer of magnetic material in a substantially flat orientation;

FIG. 3 is a vertical cross sectional view of the embodiment of FIG. 2 after placement on the interior of a wall of a structural member prior to expansion;

FIG. 4 is a vertical cross-sectional view similar to FIG. 3 showing the baffle within the structural member after expansion;

FIG. 5 is a top plan view of another embodiment of the baffle prior to expansion showing the use of two parallel and spaced strips of magnetic material located beneath a block of the baffle material, the strips being shown in broken lines;

FIG. 6 is atop plan view of the embodiment of FIG. 5 after activation and expansion of the baffle material;

FIG. 7 is a top plan view of a fourth embodiment of the baffle hereof, showing the use of a perforated strip of magnetic material located beneath the block of baffle material and shown in dotted lines, the perforated strip having its perimeter relatively inboard of the peripheral margin of the baffle material; and FIG. 8 is a vertical cross-sectional view of a fifth embodiment of the baffle hereof, wherein the magnetic material is provided as parallel strips magnetically attached to walls of the structural member oriented at right angles to one another, and the baffle material has a groove prior to expansion to facilitate folding and conformance to the walls.

DESCRIPTION OF THE PREFERRED EMBODIMENT

Referring now to the drawing, an automobile body 10 is one structure which may receive the expansible synthetic resin baffle with magnetic attachment 12 hereof. The body 10 includes a plurality of walls 14, rails 16, pillars 18 and channels 20 of steel or other ferromagnetic material which may receive the baffle 12 thereon or therein.

The baffle 12 includes a first layer 22 of baffle material 24 and a second layer 26 of magnetic material 28. The baffle material 24 is preferably a dry, flexible, initially non-tacky, thermally expansible sealant and baffle composition. Two examples of such baffle material are described in U.S. Pat. No. 5,373,027 and as Sikabaffle by Sika Corporation of Madison Heights, Michigan, and in co-pending and allowed U.S. Application Ser. No. 09/407,820 filed Sep. 28, 1999, now U.S. Pat. No. 6,150,428 both assigned to the assignee hereof and the disclosure of which is incorporated herein by reference.

For example, a composition useful for preparing a sealant and baffle composition having the desired characteristics of the present invention includes a quantity of a grafted anhydride polymer, and an amount of polymer additive containing a terminal epoxide group which reacts with at least a part of the anhydride polymer when the component is heated to a temperature experienced by an automobile body cavity receiving the baffle material as the automobile body is conveyed through a conventional paint and/or primer bake oven forming a part of the automotive manufacturing operation, e.g. about 100° C. to about 200° C.. In addition, the baffle material 24 includes a suitable blowing agent which effects expansion of the baffle material 24 when the material 24 is subjected to heat during baking of the automobile body in the bake oven. Desirably, the baffle material 24 also includes a tackifier which imparts tackiness to the outer surface of the dry, initially non-tacky baffle material 24 as it expands when subjected to bake oven heat. The grafted anhydride polymer present in the baffle material 24, which functions somewhat in the manner of an adhesive when heated in the bake oven, increases the tackiness properties of the baffle material 24 as it undergoes expansion.

The grafted anhydride polymers useful in the present invention include ethylene-vinyl acetate, ethylene-n-butyl acrylate, ethylene-octane copolymer, polyethylene, polypropylene and ethylene-rubber, each grafted with an acid anhydride functionally; a preferred acid anhydride would be maleic anhydride. The grafted anhydride polymer is preferably present in the baffle material on a wt % basis of from about 10% to about 60%. A epoxide terminated polymer additive, such as solid Bisphenol A or F diglycidyl ether polymer (derived from Bisphenol A or Bisphenol F and epichlorhydrin) characterized by an epoxide equivalent greater than about 400, is preferably present in the composition on a wt % basis of from about 1% to 10%. The baffle material 24 is also provided with a blowing agent, selected from the group of a modified or unmodified azodicarbonamide, p,p'-oxybis(benzene-sulfonyl) hydrazide, p-toluene sulfonyl hyddrazide, and dinitroso pentamethylene tertamine, present in the baffle material 24 on a wt % basis of from about 1% to 10%. A filler polymer, such as, for example, ethylene-vinyl acetate, ethylene n-butyl acrylate, ethylene-octane copolymer, polyethylene, polypropylene, and ethylene methacrylic acid copolymer, is present on a wt % basis of from about 1% to about 50%. A rubber-like constituent may also be included in the baffle material 24, which is selected from, e.g., styrene-butadiene rubber, ethylene-propylene rubber, ethylene-propylene-diene rubber, butadiene rubber, styrene isoprenet-styrene Block copolymer, styrene-butadiene-styrene Block copolymer, styrene-ethylene/butylene-styrene Block copolymer, styrene-ethlylene/propylene Block copolymer, nitrile rubber and chlorinated polyethylene is present on a wt % basis of from about 1 to 15. A molding and processing aid may be included in the baffle material 24, selected from the group including as paraffin wax, microcrystalline wax, polyethylene wax, polyamide wax, and natural wax, and may be present in an amount on a wt % basis of from about 1% to about 15%. A tackifier for enhancing tackiness of the baffle material 24 after activation may be provided and selected from a group of aliphatic hydrocarbon resins, aromatic hydrocarbon resins, aliphatic/aromatic hydrocarbon resins, hydrogenated hydrocarbon resins, polyterpene resins, rosin ester resins, coumarone indene resins, α-methyl styrene resins and polystyrene resins, and is present on a wt % basis of from about 1% to about 15%. An inorganic or organic filler may be included in the baffle material 24 on a wt % basis of from about 1% to about 20%, and selected from the group of calcium carbonate, barium sulfate, silica, calcium sulfate, aluminum silicate, magnesium silicate, potassium aluminum silicate, calcium metasilicate, pumice, glass spheres, and organic fillers.

The baffle material 24 is preferably prepared by introducing the individual constituents into a conventional continuously operable machine such as a screw or reciprocating extruder or compounding machine. Where multiple inlets are presented on the extruding machine or the like, the constituents of the baffle material, except for the reactive agents, and including the blowing agent, are added at the first entrance port, and the reactive agents and the blowing agents are added at a downstream port. A nominal processing time is about 2 minutes. Upon emerging from the extruder, the baffle material may be cut into pellets for molding or co-extruded with the magnetic material.

The magnetic material 28 is preferably a flexible and conformable material which will readily attach to ferromagnetic surfaces. The magnetic material 28 may be provided as particles of barium ferrite which are oriented and embedded in nitrile rubber. An example of such magnetic material useful in accordance with the present invention is sold as Plastiform® 1033 by The Arnold Engineering Company of Marengo, Illinois. The Plastiform® 1033 material measured at 23° C. has an advertised elongation of 18% under ASTM D-412, flexibility sufficient to meet 180° bending on a mandrel equal to 7 times the sample thickness, maximum energy product (Bd Hd max) of 1.6 MGOe/12.7×10³ kJ/m³, residual induction of 2500 Gauss/255 mT, and coercive force (pole-core hysteresigraph) of 2300 Oersteds/183 kA/m.

The baffle 12 may be formed in a variety of configurations. Initially, it may be appreciated that the baffle may be formed in co-extruded sheets with the baffle material 24 layered with the magnetic material 28. The thicknesses of the respective layers may be varied depending on the amount of magnetic attraction required and the volume of the area to be filled. As shown in FIG. 2, the baffle 12 is provided as a laminated sheet 30, with the baffle 12 being substantially flat and the thicknesses of the baffle material 24 and magnetic material 28 being relatively equal. The baffle 12 may also be formed by molding, whereby the magnetic material 28 may be introduced into a mold cavity and pellets of the baffle material 24 thereafter introduced, heated to a temperature in the range of about 80° C. to 100° C., and usually no more than about 120° C. It may thus be appreciated that the magnetic material 28 has a melting temperature in excess not only of the melting temperature of the baffle material 24, but also preferably above its activation temperature and the temperature encountered in the bake oven.

While the baffle 12 may be provided in sheet form 30 which is sufficiently flexible to conform to irregular shapes, it may be desirable to mold or extrude the baffle 12 into a pre-formed three-dimensional shape such as the embodiment of baffle 12a shown in FIGS. 3 and 4. Baffle 12a may more readily attach to curved surfaces of a structural member, such as channel 32 as shown in FIGS. 3 and 4. As shown in FIG. 3, the channel 32 includes a lower panel 34 having an arcuate ridge 36, and an upper panel 38 configured to cap or cover the end legs 40 of the generally U shaped lower panel 34. The upper panel 38 is affixed to the lower panel 34 to define therein a cavity 42 into which a pre-configured baffle 12a is placed. As may be seen in FIGS. 3 and 4, the magnetic material 28 and the baffle material 24 are formed to present a groove 44 complemental in configuration to the ridge 36 of the lower panel 34. The baffle material 24, while flexible, is typically more rigid than the magnetic material 28, and thus a thicker layer of the baffle material 24 will not only fill a larger cavity, but will also serve to retain the shape of the baffle 42. As shown in FIG. 4, upon heating of the cavity 40 to a sufficient activation temperature, typically about 110° C. to 190° C., the baffle material expands to block and seal a cross-section of the cavity 40.

Furthermore, as shown by the embodiment of the baffle 12b of FIGS. 5 and 6, the baffle 12b can be configured whereby the magnetic material 28 may be provided as strips 46 and 48 which are small than the overlying block 50 of the baffle material 24. The strips 46 and 48 are shown as positioned in substantially parallel and spaced-apart orientation, presenting a gap 52 therebetween and with the perimeter of each of the strips inboard of peripheral margin 56 of the block 50 to provide for adhesion by the baffle material 24 after activation between the perimeter 54 of the strips and the initial peripheral margin 56 of the block 50. This arrangement may be advantageous where only limited magnetic attachment may be needed to hold the baffle to the adjacent structure and where improved post-expansion adhesion is desired between the baffle material 24 and the body 10. As shown in FIG. 6, after expansion, the baffle material 24 expands substantially to adhere to the body 10 and provide an acoustical baffle.

FIG. 7 illustrates a fourth embodiment of the baffle 12c, where a strip 58 of magnetic material 28 is perforated. Holes 60 enable the baffle material 24 of block 50 to flow therethrough for improved adhesion after activation.

FIG. 8 illustrates a further embodiment as baffle 12d, wherein the baffle material 24 may be provided as a sheet 62 having an elongated groove 64 formed or cut therein to promote folding therealong, with the sheet 62 thus having panels 66 and 68 separated by the groove 64. The magnetic material 28 is provided in two separate members as spaced apart strips 70 and 72 and, as shown in FIG. 8, positioned between the panels 66 and 68 and the adjacent walls 74 and 76 of the body 10. Such an application may be particularly useful in applications such as the engine well of the body 10 shown in FIG. 1, where the baffle 12d may be applied in sharp corners. Further, the groove 64 may be provided on the upper surface 78 of the sheet 62 away from the strips 70 and 72 as shown in FIG. 8 to facilitate placement on an inside corner, or the groove 64 may be provided on the bottom surface 80 of the sheet 62 which receives the strips 70 and 72 to facilitate mounting on an outside corner.

The baffle 12 of the present invention thus presents considerable flexibility in use. As shown, the magnetic material 28 itself is flexible to conform to the underlying wall surface and may be perforated to permit passage of the activated baffle material 24 therethrough. Sheets of the baffle 12 may be cut into desired shapes, such as with dies, to thereby permit placement of the baffle 12 into desired positions of complex configuration. The thickness of the baffle material 24 may be varied according to the volume of the cavity to be filled. In addition, the baffle 12 may be removed or repositioned at any time prior to bake-out without any adverse affects on the body 10. It may be readily appreciated that the use of the automobile body 10 is illustrative of the uses of the baffle 12 hereof, and not intended to be limiting.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

What is claimed is:

1. A baffle for magnetic attachment to a body and subsequent thermally induced expansion comprising:
   a first layer of flexible thermally expansible baffle material; and
   a second layer of flexible magnetic material in laminated relationship to said first layer.

2. A baffle as set forth in claim 1, wherein the baffle material is molded to the flexible magnetic material.

3. A baffle as set forth in claim 1, wherein the baffle material is co-extruded with the flexible magnetic material.

4. A baffle as set forth in claim 1, wherein the first layer comprises a block having a greater surface area than the second layer.

5. A baffle as set forth in claim 4, wherein the block has a peripheral margin and the second layer comprises a strip having a perimeter recessed relative to the peripheral margin of the block.

6. A baffle as set forth in claim 4, wherein the second layer is perforated.

7. A baffle as set forth in claim 1, wherein the first layer includes two panels with a groove therebetween to facilitate positioning of the panels in angular relationship.

8. A baffle as set forth in claim 7, wherein the first layer has an outside surface and the groove is provided in the outside surface.

9. A baffle as set forth in claim 1, wherein the second layer comprises discrete first and second strips of magnetic material positioned in spaced relationship.

10. A baffle as set forth in claim 1, wherein at least a portion of the first layer and the second layer are formed to a substantially flat sheet configuration.

11. A baffle as set forth in claim 1, wherein at least a portion of the first layer and the second layer are formed to a substantially arcuate configuration in cross section.

12. In combination:
a body including a ferromagnetic member; and
a baffle magnetically attached to said body proximate said ferromagnetic member, said baffle comprising a first layer of flexible, thermally expansible baffle material and a second layer of flexible magnetic material in laminated relationship to said first layer, said magnetic material being positioned between at least a part of said baffle material and said body.

13. The combination of claim 12, wherein the baffle material is molded to the flexible magnetic material.

14. The combination as set forth in claim 12, wherein the baffle material is molded to the flexible magnetic material.

15. The combination as set forth in claim 12, wherein the first layer comprises a block having a greater surface area than the second layer.

16. The combination as set forth in claim 15, wherein the block has a peripheral margin and the second layer comprises a strip having a perimeter recessed relative to the peripheral margin of the block.

17. The combination as set forth in claim 15, wherein the second layer is perforated.

18. The combination as ste forth in claim 12, wherein the body includes two angularly oriented walls and the first layer includes two panels with a groove therebetween to facilitate positioning of the panels in angular relationship.

19. The combination as set forth in claim 18, wherein the first layer has an outside surface and the groove is provided in the outside surface.

20. The combination as set forth in claim 12, wherein the second layer comprises discrete first and second strips of magnetic material positioned in spaced relationship.

21. The combination as set forth in claim 12, wherein at least a portion of the first layer and the second layer are formed to a substantially flat sheet and the body includes a corresponding substantially flat wall for receiving the baffle thereon.

22. The combination as set forth in claim 12, wherein at least a portion of the first layer and the second layer are preformed to a substantially arcuate configuration in cross section, said arcuate portion being complementally configured to and positioned on a corresponding arcuate section of the body.

23. A method of providing a baffle on a body, comprising the steps of:
providing a body having a ferromagnetic component;
providing a baffle having a first layer of a flexible thermally expansible baffle material and a second layer of a flexible magnetic material in laminated relationship to said first layer;
magnetically attaching the baffle to the body in proximity to the ferromagnetic component whereby the baffle substantially conforms to the configuration of at least a part of the body; and
subjecting the baffle and the body to an elevated temperature, whereby the baffle material expands and adheres to the body around the magnetic material.

24. The combination as set forth in claim 21, wherein at least apart of the body includes a corresponding arcuate wall receiving a second portion of the first layer and the second layer thereon in conforming relationship.

25. The method of claim 23, wherein the baffle is initially substantially flat and the at least apart of the body includes a curved portion, and wherein the attaching step includes flexing the baffle to conform to the curved portion.

26. The method of claim 23, wherein the at least a part of the body includes a curved portion and the baffle is preformed whereby the second layer substantially conforms to the configuration of at least a part of the body.

\* \* \* \* \*